(12) United States Patent
Nagashima

(10) Patent No.: US 9,487,302 B2
(45) Date of Patent: Nov. 8, 2016

(54) ENGINE CONTROL COMPUTER OF AIRCRAFT, AND AIRCRAFT

(71) Applicant: MITSUBISHI AIRCRAFT CORPORATION, Aichi (JP)

(72) Inventor: Yoshihiro Nagashima, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/547,384

(22) Filed: Nov. 19, 2014

(65) Prior Publication Data

US 2015/0148994 A1 May 28, 2015

(30) Foreign Application Priority Data

Nov. 25, 2013 (JP) ................. 2013-242627

(51) Int. Cl.
| | |
|---|---|
| *B64D 31/06* | (2006.01) |
| *B64D 31/04* | (2006.01) |
| *B64D 31/14* | (2006.01) |
| *F02C 7/262* | (2006.01) |
| *F02C 9/28* | (2006.01) |

(52) U.S. Cl.
CPC ............... *B64D 31/06* (2013.01); *B64D 31/04* (2013.01); *B64D 31/14* (2013.01); *F02C 7/262* (2013.01); *F02C 9/28* (2013.01); *F05D 2270/092* (2013.01); *F05D 2270/312* (2013.01)

(58) Field of Classification Search
CPC ...... B64D 31/06; B64D 31/14; B64D 31/04; F02C 7/262; F05D 2270/312; F05D 2270/092
USPC .............................................. 701/3
See application file for complete search history.

(56) References Cited

U.S. PATENT DOCUMENTS

2013/0325221 A1* 12/2013 Shue .................... G05D 1/0653
701/16

FOREIGN PATENT DOCUMENTS

JP      2012-510585 A      5/2012

* cited by examiner

*Primary Examiner* — Brian P Sweeney
(74) *Attorney, Agent, or Firm* — Pearne & Gordon LLP

(57) ABSTRACT

The invention deals with the restriction on the mode change of an engine due to latching in the case of restarting the engine that has stopped in flight. A FADEC that controls an engine of an aircraft in accordance with a mode, includes a latch operating section that latches the mode, and an in-parking/in-flight determining section that determines whether the aircraft is on the ground or flying off the ground. The latch operating section operates when the in-parking/in-flight determining section determines the aircraft is on the ground, and does not operate when the in-parking/in-flight determining section determines that the aircraft is in fight.

7 Claims, 8 Drawing Sheets

ENGINE CONTROL COMPUTER OF AIRCRAFT, AND AIRCRAFT

BACKGROUND OF THE INVENTION

Field of the Invention

The present invention relates to a control computer that controls an engine of an aircraft, and to an aircraft.

Description of the Related Art

The engines of an aircraft are controlled by control computers called FADECs (Full Authority Digital Engine Control) (e.g., National Publication of International Patent Application No. 2012-510585).

The FADECs control the engines in collaboration with other control computers installed in the aircraft so as to obtain optimal performances from the viewpoints of safety and fuel efficiency.

At the time of a takeoff, the mode of the engines is selected to a Take off mode in which a thrust is large. Then, the takeoff is started normally with a thrust lever set at a lever position called TOGA (Take Off/Go Around).

After that, it is required to output a large thrust from the engines to secure the stability of the takeoff until the aircraft reaches an altitude (typically 400 feet) sufficiently away from the ground. Thus, the FADECs latch the mode of the engines into the Take off mode until a predetermined altitude difference (400 feet) is secured with respect to the ground.

Now, an engine may stop while an aircraft flies in the air, due to wind and rain blowing into the engine, or the like. If the engine is restarted in this case and a reference altitude for latching is updated, the FADEC performs the latching process as with the takeoff from the ground even in flight.

Specifically, as shown in FIG. 8, an engine stops in flight (A), and the engine is restarted (B). Assume that the thrust lever is thereafter set at the TOGA position. Then, the aircraft loses the altitude thereof until the engine is started and the output thereof increases (C), but ascends thereafter (D).

Here, the latch is activated during a period ((B) to (E)) until a predetermined altitude difference ΔH (400 feet) is secured (E) with respect to an altitude $H_S$ at the time of restarting the engine (B) that is set as a starting altitude (reference altitude).

That is, since the latch is not released during a long period after the engine is restarted (B) and the aircraft recovers the lost altitude (C) and (D) until it further ascends by 400 feet (E), the change to an appropriate mode is restricted. In addition, since the altitude needs to be gained only for releasing the latch, fuel is uselessly consumed.

The present invention has an object to provide an engine control computer of an aircraft that can deal with the restriction on the mode change of the engine due to latching in the case where an engine that stops in flight is restarted, and to provide an aircraft.

SUMMARY OF THE INVENTION

The present invention is a computer that controls the engines of an aircraft in accordance with a mode of the engines, and the computer includes, as processing modules constituting a computer program, a latch operating section that latches the mode, and an in-parking/in-flight determining section that determines whether the aircraft is on the ground or flying off the ground. The latch operating section operates when the in-parking/in-flight determining section determines that the aircraft is on the ground, or does not operate when the aircraft is determined to be in flight.

The purpose of latching the mode of the engines is, as described above, to secure the stability of a takeoff by latching the mode into the Take off mode at the time of the takeoff until a predetermined altitude difference (typically 400 feet) is secured with respect to the ground.

In the present invention, "reference altitude," which is the criterion of an altitude for latching, is in principle the altitude of the ground. This reference altitude can be set, for example, when the engine is started. Then, in a conventional practice, if an engine is restarted in flight, the reference altitude is updated to an altitude at the time of restarting (an altitude in the air).

Here, when the reference altitude is updated to an altitude in the air due to the restart of the engine in flight, and the latch is activated at a predetermined timing (e.g., at a timing when a thrust control member is set at the TOGA position), an unintended latch is activated and the mode change is restricted until a predetermined altitude difference is secured with respect to the altitude in the air, as described above.

To deal with this, there are provided a first invention in which the latch of the mode is not activated in flight, and a second invention in which the restriction on the mode due to latching is eased by devising how to update the reference altitude.

In the first invention, prior to latching the mode of the engine, the in-parking/in-flight determining section determines whether the aircraft is on the ground or flying off the ground.

Then, the latch of the mode is activated when the aircraft is determined to be on the ground, but the latch of the mode is not activated when the aircraft is determined to be flying off the ground.

In such a manner, as long as the aircraft is in flight, the mode is not latched irrespective of whether the engine stops and is restarted or the engine normally operates without stopping.

Therefore, even if the restart is performed in flight and the reference altitude is updated to an altitude in the air at which the engine is restarted, the mode is not latched in flight irrespective of that. Thus there is no inconvenience in that the change of the mode is restricted while being latched into an unintended mode for a long time in the air, and it is possible to change to an appropriate mode. In addition, fuel is not to be uselessly consumed as is the case with the mode change restricted.

The engine control computers of the first invention preferably control a plurality of engines included in the aircraft individually. The engine control computer of the first invention can be configured for each of the plurality of engines, and can be also configured to collectively include processing modules that are prepared for each of the plurality of engines, respectively. The above is also applied to the second invention.

Here, because it is desirable to achieve the balance of thrust between the left and right engines in terms of controlling, it is preferable to select the same mode for all the engines.

Suppose that the mode is latched without determining whether the aircraft is on the ground or in flight. In such a manner, with respect to an engine that does not stop and is not restarted in flight, a reference altitude can be set at the altitude of the ground, and the mode is not latched while the aircraft flies in the air higher than an altitude obtained by adding a predetermined altitude difference to the reference altitude (a releasing altitude at which the latch is released). In contrast, with respect to an engine that stops and is restarted in flight, if the reference altitude is updated to an altitude at which the engine is restarted, the mode is latched within a range from the reference altitude to the releasing altitude.

The first invention can also deal with a situation where the balance of thrust between the right and left engines is lost because the same mode cannot be selected for all the engines in the above case.

That is, assuming that the mode is latched for all of the plurality of engines of the aircraft only during the period after the aircraft takes off until reaching an altitude sufficiently away from the ground and that the mode is not latched irrespective of whether the engine stops and is restarted or normally operates without encountering trouble of stopping or the like as long as the aircraft is in flight, the same mode can be selected for all the engine and it is possible to achieve the balance of thrust between the right and left engines.

In the engine control computer of the aircraft of the first invention, the in-parking/in-flight determining section determines that the aircraft is on the ground when a load is imposed on landing gears included in the aircraft, and determines that the aircraft is in flight when no load is imposed on the landing gears.

Avionics, which is a system of an aircraft, includes sensors that detect loads on landing gears (WOW; weight on wheel) in order to perform various controls of an airframe. Using such existing sensors makes possible to determine the cases in starting the engines.

The in-parking/in-flight determining section in the first invention can perform the determinations on the basis of a measured value by a radio altimeter installed in the aircraft.

The radio altimeter includes a radio transmitting unit that emits radio waves toward the ground and a radio receiving unit that receives radio waves reflected off the ground, and calculates an altitude making use of the correlation between the emitted radio waves and the reflected radio waves. A measured altitude value by this radio altimeter represents a distance between the ground and the aircraft. The in-parking/in-flight determining section can determine that the aircraft is on the ground when the measured altitude value by the radio altimeter is less than or equal to a predetermined threshold value being substantially "zero," and can determine that the aircraft is in flight when the measured altitude value exceeds the predetermined threshold value.

The second invention is a computer that controls the engine of an aircraft in accordance with a mode of the engine, and includes, as processing modules constituting a computer program, a latch operating section that latches the mode until the aircraft ascends from a reference altitude by a predetermined altitude. The reference altitude is set at the altitude of the ground, and if the engine is restarted in flight, the reference altitude is set at an altitude lower than an altitude at which the restart is performed.

Even when the engine stops and is restarted, the altitude is lost while the engine is starting. In addition, even when the start of the engine is completed, the altitude is also lost when the aircraft makes a landing.

Therefore, if the criterion of an altitude is set at an altitude at which the engine is started (starting altitude), the latch is not released until the aircraft recovers the altitude up to the starting altitude and further ascends by a predetermined altitude difference from the starting altitude, and thus the change of the mode is restricted, as described above.

For this reason, in the second invention, when the engine is restarted in flight, the reference altitude is set at an altitude lower than the altitude at which the restart is performed.

In such a manner, an interval from the reference altitude to the starting altitude is also included in the calculation of the required altitude difference with respect to the reference altitude. The latch is thereby released earlier at the altitude obtained by adding the altitude difference to the reference altitude as compared with the case where the reference altitude is set at the altitude at the time of restarting, and the mode can be changed.

According to the second invention, the mode is latched when the engine is restarted not only in taking off but also in flight, but it is possible to ease the restriction on the mode change due to latching.

In addition, in the second invention, even if the same mode cannot be selected for the engine that is restarted in flight and for other engines while the mode change is restricted, this does not have influence on the stability in flight since a period during which the mode change is restricted due to latching is short.

In the engine control computer of the second invention, in the case where the engine is restarted in flight, the latch operating section preferably operates when a thrust control member that changes the thrust of the engine is set at an operating position for takeoff (typically TOGA position), and the reference altitude is preferably set at an altitude at which the aircraft shifts from a descent to an ascent when the thrust control member is set at the operating position for takeoff.

In such a manner, the reference altitude is to be set at the lowest altitude in a process (an altitude at which the aircraft shifts from a descent to an ascent) during which the engine is restarted in flight, the aircraft once descends thereafter, setting at the operating position for takeoff increases the output of the engine, and the aircraft recovers the altitude.

Therefore, since the aircraft reaches earlier an altitude obtained by adding the altitude difference to the reference altitude and the latch is released allowing the mode to be changed, it is possible to ease the restriction on the mode change due to latching in flight.

An aircraft of the present invention includes engines that output thrust, and the above-described engine control computers that control the engines in accordance with a mode.

The aircraft of the present invention includes a plurality of engines, and it is preferable that all the engines are controlled by the above-described control computers. The control computer is typically configured for each engine individually.

According to the present invention, it is possible to remove or ease the restriction on the mode change due to latching in flight.

DETAILED DESCRIPTION OF THE PREFERRED EMBODIMENTS

Embodiments of the present invention will be described below with reference to the drawings.

First Embodiment

Figure 1:
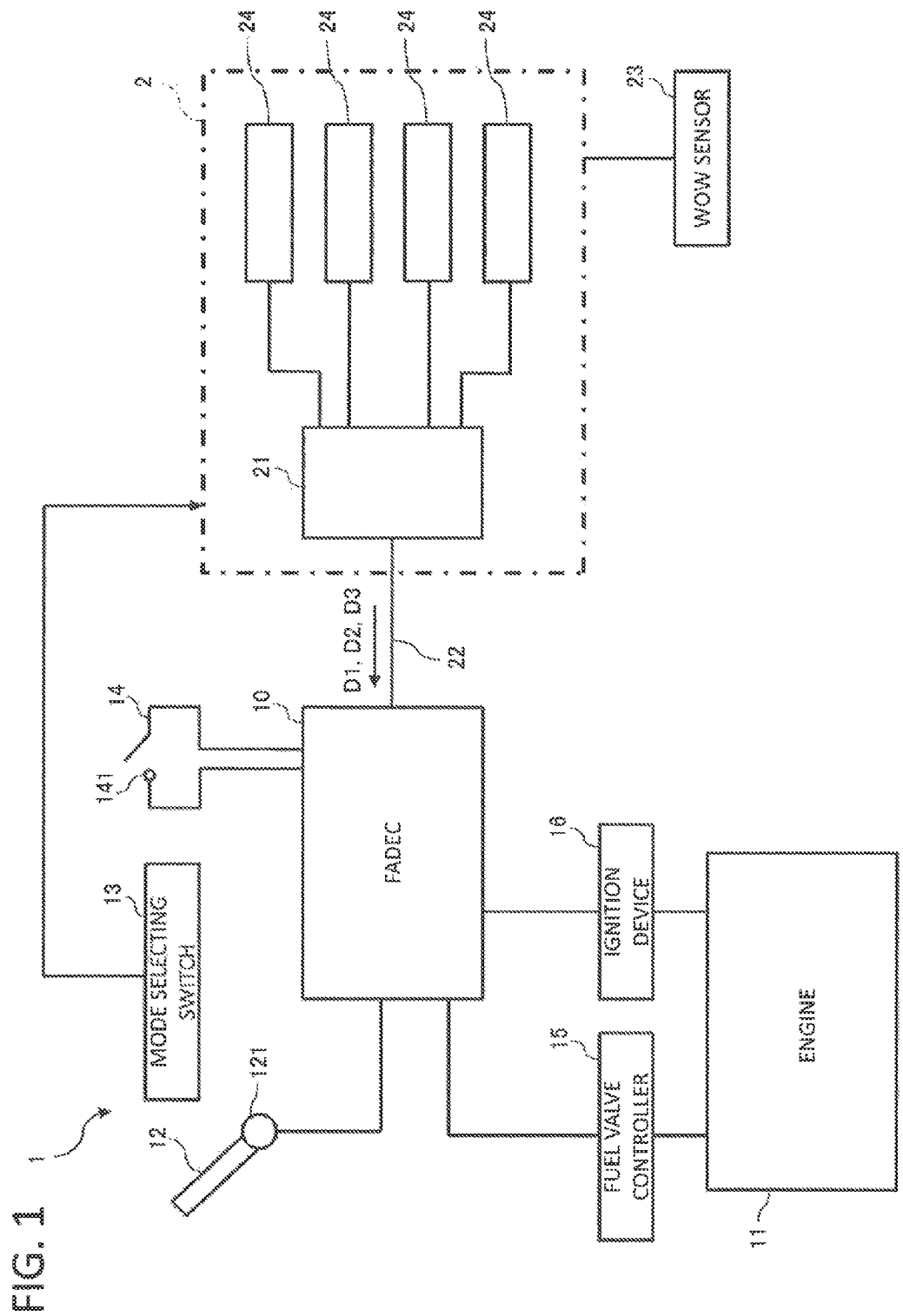
FIG. 1 is a schematic diagram showing a FADEC and the peripheral configuration thereof according to a first embodiment.

An engine control system 1 including a FADEC 10 shown in FIG. 1 is installed in an aircraft and controls an engine 11 of the aircraft.

The engine control system 1 includes the FADEC 10, a thrust lever 12, an engine starting switch 14, a fuel valve controller 15, and an ignition device 16.

The engine control system 1 is provided for each of the plurality of engines 11 included in the aircraft, and individually control the engines 11.

To the engine control system 1, power is supplied from a power supply device (not shown) included in the aircraft during a flight. This power supply device includes generators with which the engines 11 are equipped.

The engine control system 1 is connected to an external power supply at the time of maintenance.

The thrust lever 12 is operated in a reciprocating manner to adjust an engine thrust to appropriate one.

The thrust lever 12 is set up with lever positions such as IDLE, TOGA, maximum thrust, and reverse thrust.

The TOGA (Take Off/Go Around) is an operating position used when performing Take off and Go around, at which a large thrust is generated from the engine 11 to cause airframe to climb.

Note that, by setting up the TOGA position in such a manner as to divide it into a plurality of positions of different thrusts, it is possible to select a lever position with which a most appropriate thrust can be generated for a load in accordance with the number of passengers.

The thrust lever 12 includes an angular sensor 121 for detecting the reciprocating angle of the lever.

The angular sensor 121 outputs the reciprocating angle of the thrust lever 12 to the FADEC 10. The FADEC 10 converts an angle that is input from the angular sensor 121 of the thrust lever 12 into the lever position of the thrust lever 12.

The angular sensor 121 is duplexed to provide a redundancy. This is also applied to the engine starting switch 14 and the mode selecting switch 13.

The engine starting switch 14 is operated to start or stop the engine 11.

The engine starting switch 14 has a contact 141 which is switched between on and off. Upon operated to be turned on, the engine starting switch 14 outputs an engine starting signal to the FADEC 10. Upon operated to be turned off, the engine starting switch 14 outputs an engine stopping signal to the FADEC 10.

The fuel valve controller 15 adjusts the fuel valve of the engine 11 to control the amount of fuel supply to the engine 11.

The ignition device 16 ignites the engine 11 by igniting fuel.

The FADEC 10 is a control computer that electronically controls the engine 11 using many sensors and many actuators included in the engine control system 1, and also called ECU (Engine Control Unit).

The FADEC 10 includes a nonvolatile memory in which a computer program and the like are stored, a volatile memory in which data and the like needed to process the computer program is temporarily stored, and a calculation processing unit constituted by a CPU (Central Processing Unit) or the like.

The FADEC 10 causes the engine 1 to operate in any mode selected from among a plurality of modes.

The prepared modes include a Take Off mode (TO mode) used in taking off, a Climb mode (CLB mode) used in climbing, and a Go Around mode (GA mode) used in going around. In the Take off mode and the Go Around mode, the engine 11 outputs a thrust larger than that in the CLB mode.

The Take off mode may be fragmented such as into a large thrust mode, a middle thrust mode, and a small thrust mode, in accordance with the magnitude of the thrust. From among these modes, a mode suitable for the load in accordance with the number of passengers can be selected.

The mode selecting switch 13 is provided in a cockpit and operated to select the mode of the engine 11. The mode selecting switch 13 of the present embodiment is constituted by a plurality of push button switches to switch the mode.

When the mode selecting switch 13 is operated, a mode signal D1 indicating a selected mode is output to an Avionics 2, and transmitted to the FADEC 10 via a controller 21 and a data bus 22.

To the FADEC 10, the above-described thrust lever 12, the mode selecting switch 13, the engine starting switch 14, the fuel valve controller 15, and the ignition device 16 are connected.

Upon receiving the engine starting signal from the engine starting switch 14, the FADEC 10 gives the fuel valve controller 15 and the ignition device 16 an instruction via an electric circuit (not shown), to start the engine 11.

Then, the FADEC 10 gives the fuel valve controller 15 and the ignition device 16 an instruction on the basis of the selected mode and the lever position into which the reciprocating angle of the thrust lever 12 is converted, to adjust the thrust of the engine 11.

The FADEC 10 is connected to the Avionics 2 installed in the aircraft.

The Avionics 2 includes various systems 24 of the aircraft such as a communication system, a navigation system, an automatic pilot system, a fuel control system, and a flight management system. In addition, the Avionics 2 includes the controller 21 that serves to communicate data between the systems 24, or between the systems 24 and the outside.

The FADEC 10 is connected to the controller 21 via the data bus 22.

Part of the systems included in the Avionics 2 generates a mode signal D2 to instruct a mode of the engine 11. The mode signal D2 is transmitted to the FADEC 10 via the controller 21 and the data bus 22.

In addition, data that is generated by the systems of the Avionics 2 and needed by the FADEC 10 for the control thereof is also transmitted to the FADEC 10 via the controller 21 and the data bus 22.

For example, main landing gear load data D3 detected by WOW (weight on wheel) sensors 23 provided in main landing gears included in the aircraft is transmitted to the FADEC 10.

The WOW sensors 23 detect loads imposed on the main landing gears. In parking on the ground, the load of the airframe is imposed on the main landing gears, but in flight, the load of the airframe is not imposed on the main landing gears, and it is thus possible to determine whether the aircraft is in parking or in flight on the basis of the main landing gear load data D3.

The FADEC 10 performs various processes under the computer program.

In principle, the FADEC 10 selects a mode on the basis of the mode signal D1 that is input when the mode selecting switch 13 is manually selected, or the mode signal D2 that is transmitted from the systems of the Avionics 2.

Here, due to a misoperation of the mode selecting switch 13 or a malfunction in the systems of the Avionics 2, a mode signal D1 or D2 indicating an inappropriate mode may be input into the FADEC 10.

Generally, the Design Assurance Level (DAL) of the Avionics 2 is lower than the DAL of the FADEC 10. Therefore, there may be a flaw such as a bug in the computer program for the Avionics 2.

If a mode signal D1 or D2 indicating a mode in which a thrust is smaller than that in the Take off mode is input in the FADEC 10 in taking off due to a misoperation of the mode selecting switch 13 or a malfunction of the systems of the Avionics 2, the thrust may be decreased, resulting in a collision with an obstacle such as a tree and a building.

Thus, in taking off, the FADEC 10 does not change the mode but latches the mode into the Take off mode selected for the takeoff even when receiving the mode signal D1 or D2, until a predetermined altitude difference ΔH (typically 400 feet) is secured with respect to the ground.

Figure 2:
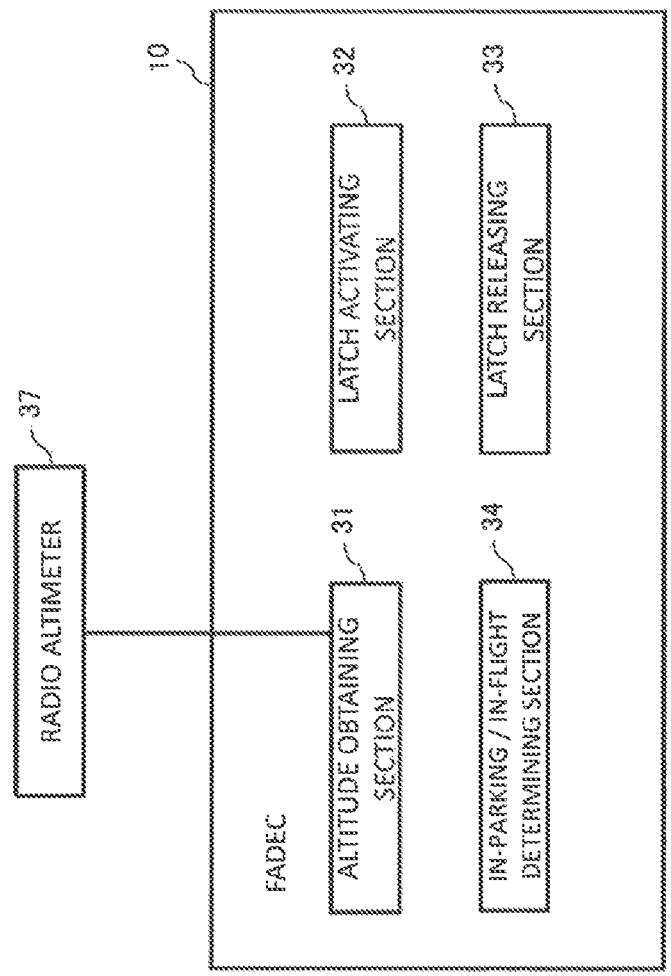
FIG. 2 is a block diagram showing the configuration of the FADEC according to the first embodiment.

As shown in FIG. 2, the FADEC 10 includes, as processing modules constituting the computer program, an altitude obtaining section 31 that obtains the altitude of the aircraft, an latch activating section 32 that activates the latch of the mode, and a latch releasing section 33 that releases the latch of the mode. These sections 31 to 33 are a configuration used to implement a piece of logic to latch the mode. The latch activating section 32 and the latch releasing section 33 configure a latch operating section.

In addition, if the engine 11 stops and is restarted in flight, the FADEC 10 does not execute the piece of latching logic but allows a mode change, as will be described hereafter. In order to implement this, the FADEC 10 also includes an in-parking/in-flight determining section 34 that determines whether or not the aircraft is on the ground or flying off the ground.

The altitude obtaining section 31 obtains an altitude H at which the aircraft is. The altitude obtaining section 31 obtains the altitude H from a radio altimeter 37 installed in the aircraft. A measured value by the radio altimeter 37 is transmitted to the FADEC 10 from the Avionics 2 via the data bus 22.

The radio altimeter 37 includes a radio transmitting unit that emits radio waves toward the ground and a radio receiving unit that receives radio waves reflected off the ground, and calculates an altitude making use of the correlation between the emitted radio waves and the reflected radio waves. This measured altitude value by the radio altimeter 37 represents a distance between the ground and the aircraft.

The altitude H of the aircraft can be also converted from the measured value of an outside pressure. A barometer installed in the engine 11 can be used to measure the outside pressure.

The barometer sets an outside pressure (surface pressure $P_0$) measured when the aircraft is on the ground (in parking) as a criterion, and measures a difference ΔP from the surface pressure $P_0$.

The altitude obtaining section 31 converts the difference ΔP measured by the barometer into an altitude, and uses the altitude (ground altitude $H_0$) of the aircraft corresponding to the surface pressure $P_0$ as a criterion to obtain the altitude H of the aircraft with respect to the ground altitude $H_0$. This altitude H represents a difference from the ground altitude $H_0$.

Obtaining the altitude by converting the outside pressure is influenced by changes in barometric pressure, but the radio altimeter 37 can have a high precision as long as the radio waves can reach the ground and the reflected waves can be received.

In the present embodiment, the latch is configured not to operate at such an altitude in the air that radio waves cannot reach, and thus the radio altimeter 37 is used to measure an altitude relating to the latch.

In the present embodiment in which the radio altimeter 37 is used, the latch is released at the time when the distance between the aircraft having taken off and the ground reaches the altitude difference ΔH.

In contrast, in a second embodiment in which the latch is operated both at the time of taking off and flying in the air, an altitude relating to the latch is calculated by converting the outside pressure. Note that, also in the second embodiment, the radio altimeter 37 can be used at the time of taking off.

The latch activating section 32 activates the latch of the mode at a timing when the thrust lever 12 is set at the TOGA position. Thereafter, the mode is not changed but continues to be latched until the latch is released even when the FADEC 10 receives the mode signal D1 or D2 indicating a mode.

The FADEC 10 includes a module that converts an angle that is input from the angular sensor 121 of the thrust lever 12 into a lever position, and when the latch activating section 32 is notified by the module that the thrust lever 12 is set at the TOGA position, the latch activating section 32 activates the latch of the mode.

The latch of the mode is activated within a range from a predetermined reference altitude to a releasing altitude obtained by adding the altitude difference ΔH to the reference altitude.

In the present embodiment in which the radio altimeter 37 is used, the reference altitude is an altitude of the ground on which radio waves are incident. The term "ground" here includes a mountain and a valley, and a structure on the ground such as a building.

The latch releasing section 33 releases the latch when the altitude obtaining section 31 obtains the altitude difference ΔH representing the distance from the ground. The mode can be thereby changed on the basis of the mode signal D1 or D2.

The in-parking/in-flight determining section 34 receives the main landing gear load data D3 from the WOW sensors 23 of the Avionics 2 via the data bus 22. Then, the in-parking/in-flight determining section 34 determines that the aircraft is in flight when the load represented by the main landing gear load data D3 is less than or equal to a predetermined threshold value being substantially "zero," and determines that the aircraft is on the ground when the load exceeds the predetermined threshold value.

Next, a process in which the FADEC 10 latches the mode in taking off will be described with reference to FIG. 3.

First, a series of processes performed when the aircraft is parking on the ground (1).

When the power of the engine control system 1 is turned on, the FADEC 10 is started. The mode of the engine 11 is automatically selected at the Take off mode on the basis of the mode signal D2 transmitted from the Avionics 2 to the FADEC 10.

When the engine 11 is started by the engine starting switch 14 and the thrust lever 12 is set at the TOGA position, the aircraft starts to take off.

In addition, when the thrust lever 12 is set at the TOGA position, the latch activating section 32 activates the latch.

The latch of the mode continues after the thrust lever 12 is set at the TOGA position (1) until the altitude obtaining section 31 obtains the altitude difference ΔH (2) ((1) to (2)).

In the meantime, for example, even if the FADEC 10 receives the mode signal D2 indicating the CLB mode from the systems of the Avionics 2, a process of selecting a mode on the basis of the mode signal D2 is cancelled. Therefore, the mode is not changed from the Take off mode that is selected at the time of taking off.

Then, when the altitude obtaining section 31 obtains the altitude difference ΔH (2), the latch releasing section 33 releases the latch. The mode can be thereby changed from the Take off mode to another mode. On the basis of the mode signal D1 or mode signal D2, the mode change is performed typically from the Take off mode to the CLB mode (3).

Assume that, in flight in the air thereafter, the engine 11 stops due to wind and rain blowing into the engine or some trouble, or is intentionally stopped for the purpose of training or test (4), and in this case, assume that the engine 11 is restarted by the operation of the engine starting switch 14 (5).

Note that, when the engine 11 stops, a reigniting function is normally performed by the FADEC 10. In case where the engine 11 is not ignited although the function is performed, a pilot tries restarting the engine 11 using the engine starting switch 14.

When the engine 11 stops in flight in the air, the thrust lever 12 is generally positioned between IDLE and TOGA, and the mode of the engine 11 is the CLB mode.

A procedure to restart the engine 11 is to turn off the engine starting switch 14, then turn it on.

In principle, the thrust lever 12 is returned to the IDLE position before the engine 11 is restarted.

Figure 8:
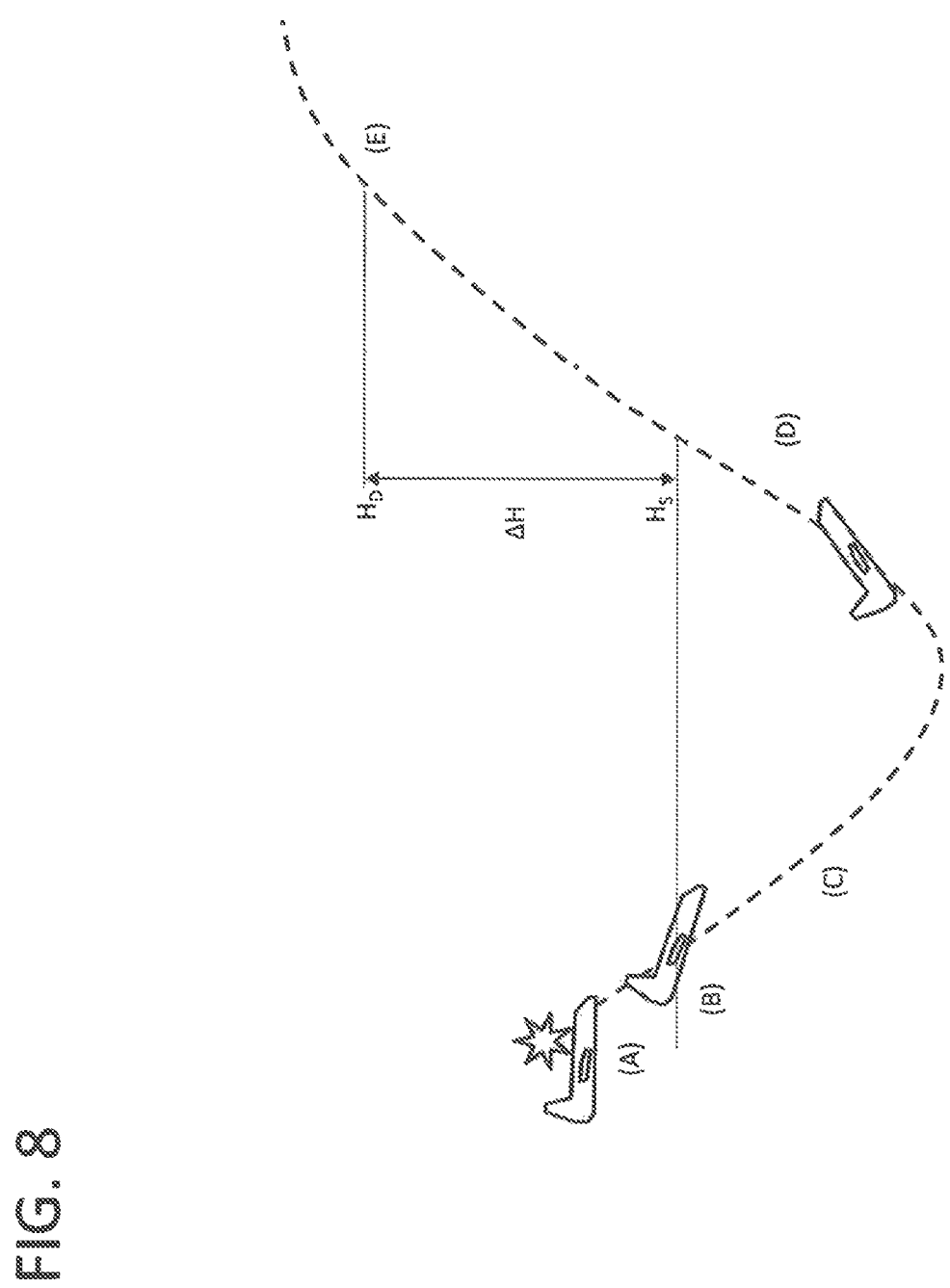
FIG. 8 is a diagram for illustrating an unintentional latch that is set in flight in a conventional practice.

Supposing that the latch is to be operated when the thrust lever 12 is set at the TOGA position after the engine 11 is restarted in flight, as described with reference to FIG. 8, the mode is latched and the mode change is restricted for a long period of time after the aircraft 1 recovers a lost altitude (C) and (D) with respect to an altitude at which the engine 11 is restarted (B) until further ascends by a predetermined altitude $H_D$ from a starting altitude $H_S$ at the time of restarting (E).

Thus, in the present embodiment, the mode is not latched but allowed to be changed in flight, and the mode is latched only in taking off.

Therefore, as will be described, every time the engine 11 is started, the in-parking/in-flight determining section 34 determines whether the aircraft is on the ground or flying off the ground.

Figure 4:
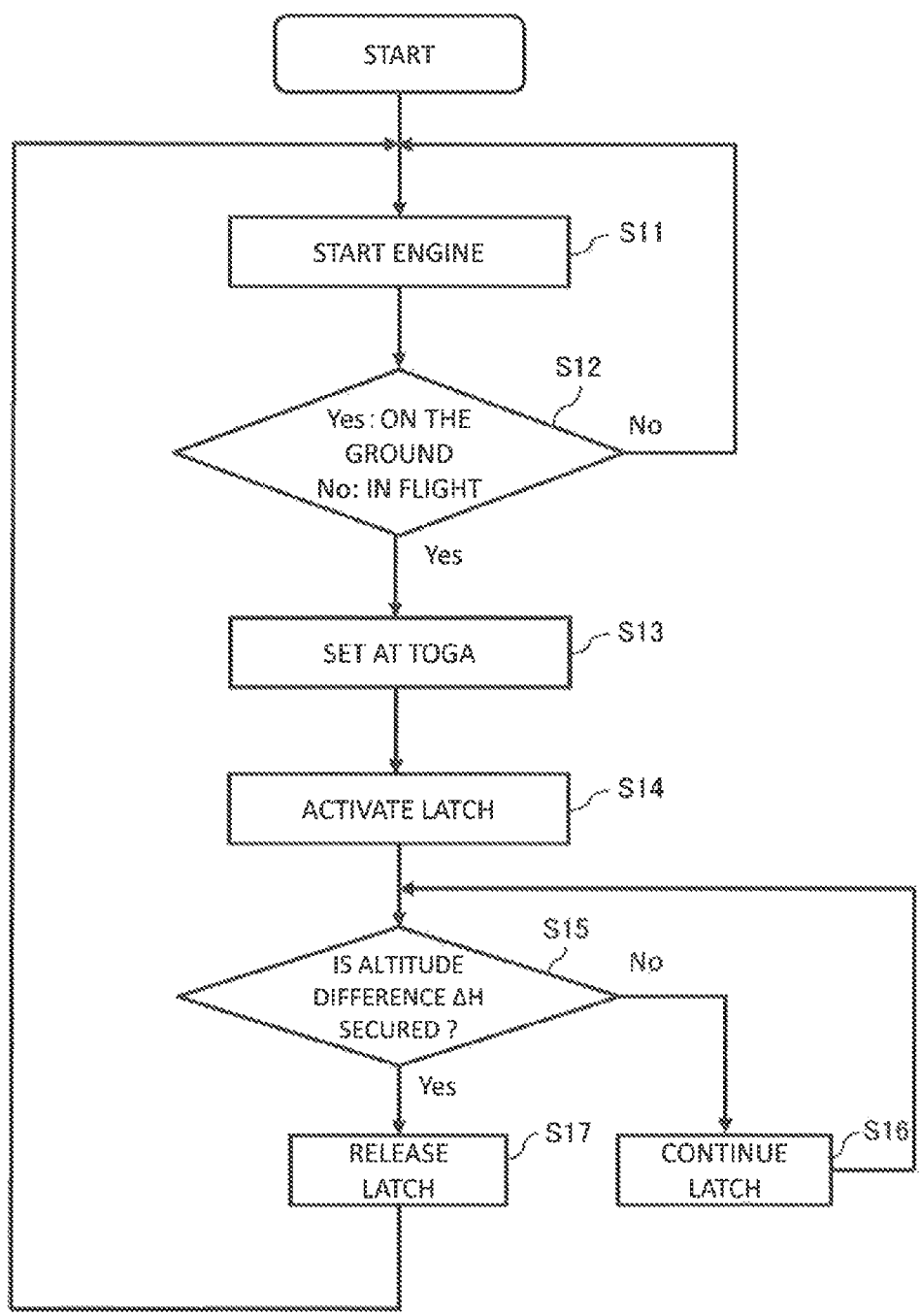
FIG. 4 is a flow chart showing the process in the FADEC according to the first embodiment.

FIG. 4 shows an example of a process subsequent to the start of the engine 11, during a flight after the power of the engine control system 1 is turned on (start) until turned off.

The description will be made below with reference to FIG. 4 and FIG. 3.

Figure 3:
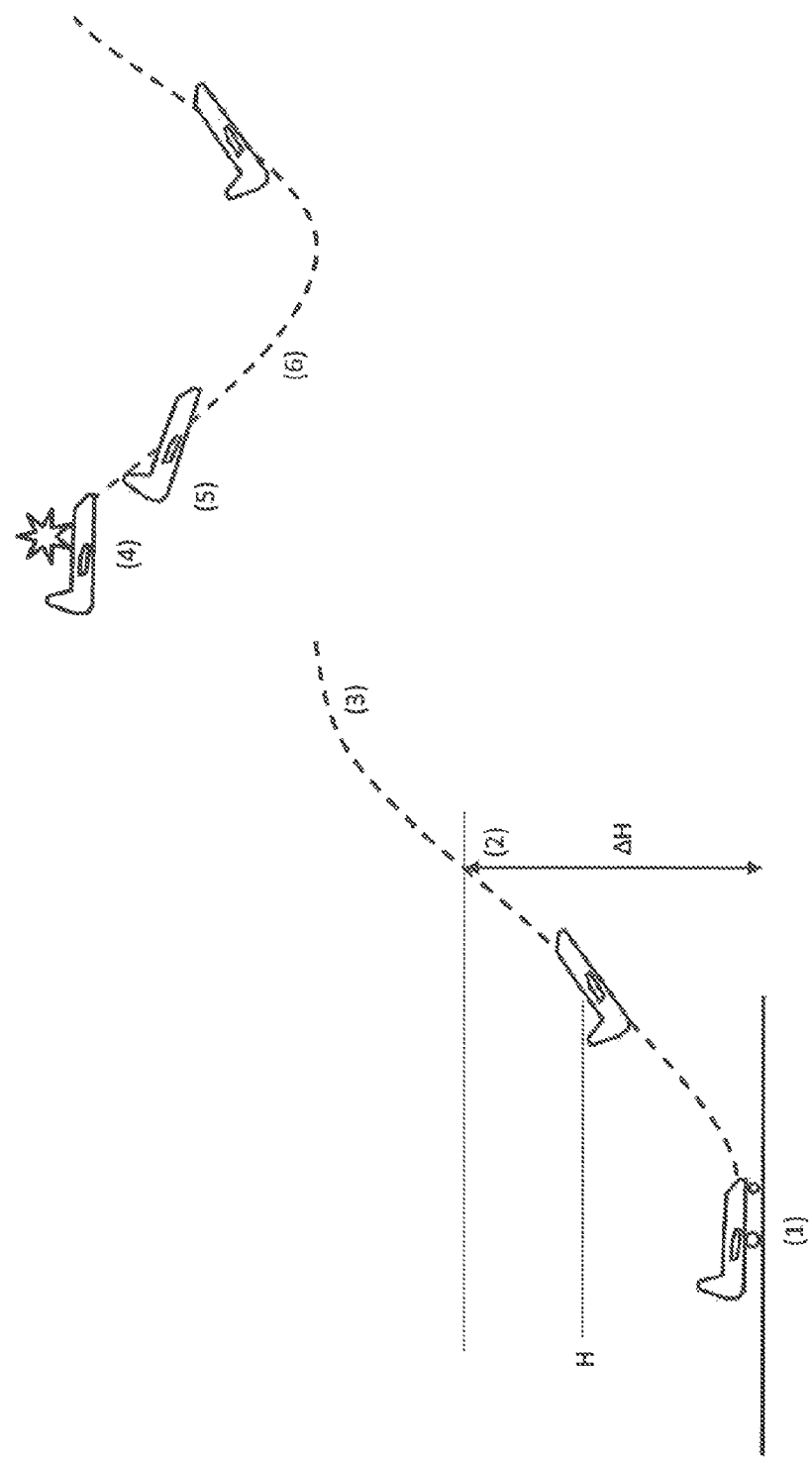
FIG. 3 is a schematic diagram showing the situations of taking off, engine stopping, and engine restarting, in the first embodiment.

In parking on the ground, the engine 11 is started by the operation of the engine starting switch 14 (engine starting step S11, (1) in FIG. 3). The Take off mode has been already selected as the mode of the engine 11 by the mode signal D2 from the Avionics 2.

In the present embodiment, after the engine 11 is started, in-parking/in-flight determining step S12 is performed prior to the latching process.

In in-parking/in-flight determining step S12, the in-parking/in-flight determining section 34 determines whether or not the aircraft is on the ground on the basis of the main landing gear load data D3.

In the case where the aircraft is on the ground (Yes in step S12), when the thrust lever 12 is set at the TOGA position at the time of taking off (Yes in step S13), the latch activating section 32 activates the latch of the mode (latch activating step S14).

When the latch is activated, it is determined whether or not the altitude difference ΔH is secured with respect to the ground while the altitude obtaining section 31 obtains the altitude of the aircraft (altitude determining step S15).

If the determination in this step S15 is No, the latch of the mode continues (latch continuing step S16).

Until the altitude difference ΔH is secured between the aircraft having taken off and the ground ((2) in FIG. 3), the altitude determining step S15 and the latch continuing step S16 are repeated. The mode is thereby maintained at the Take off mode ((1) to (2) in FIG. 3).

When the distance from the ground reaches the altitude difference ΔH (Yes in step S15), the latch releasing section 33 releases the latch of the mode (latch releasing step S17). The mode can be thereby changed, and for example, the mode is changed from the Take off mode to the CLB mode ((3) in FIG. 3).

Assume that the engine 11 thereafter stops in the air ((4) in FIG. 3) and the engine 11 is restarted ((5) in FIG. 3). In this case, the flow returns to engine starting step S11 and in-parking/in-flight determining step S12 is performed again.

Since the aircraft is determined to be in flight in this step S12 (No in step S12), the latching process including the above steps S14 to S17 is not performed.

Thus, the mode selection is not restricted, and the aircraft can be navigated in any mode.

Therefore, the latching process is not performed even if the thrust lever 12 is set at the TOGA position ((6) in FIG. 3), and it is thus possible to select a desired mode irrespective of the flight altitude and also to recover the altitude quickly.

As described above, in the present embodiment, it is determined whether the aircraft is on the ground or in fight, and the latch of the mode is activated when the aircraft is determined to be on the ground, and the latch of the mode is not activated when the aircraft is determined to be in flight.

In such a manner, as long as the aircraft is in flight, the mode is not latched irrespective of whether the engine 11 stops and is restarted or the engine 11 normally operates without stopping.

Therefore, it is possible to select an appropriate engine mode without latching the mode into unintentional one in the air. Naturally, since the altitude does not need to be gained only for releasing the latch, fuel is not to be uselessly consumed.

In addition, since all the plurality of engines 11 are controlled by the FADEC 10 in the same manner, the mode is latched in all the engines 11 only during a period after the takeoff until the distance from the ground reaches the altitude difference ΔH. That is, as long as the aircraft is in flight, the mode is not latched irrespective of whether the engine 11 stops and is restarted or the engine 11 operates without encountering trouble of stopping or the like, and it is thus possible to select the same mode for all the engines 11, achieving a balance of the thrust between the left and right engines 11.

In the above-described first embodiment, the radio altimeter 37 is used to measure the altitude relating to the latching, and an altitude converted from the outside pressure can be also used.

In this case, latching the mode is performed up to a releasing altitude obtained by adding the altitude difference ΔH to the reference altitude, considering the altitude of the aircraft in parking (ground altitude $H_0$ of an airport) to be a reference altitude.

Second Embodiment

Next, a second embodiment of the present invention will be described with reference to FIG. 5 to FIG. 7.

Figure 5:
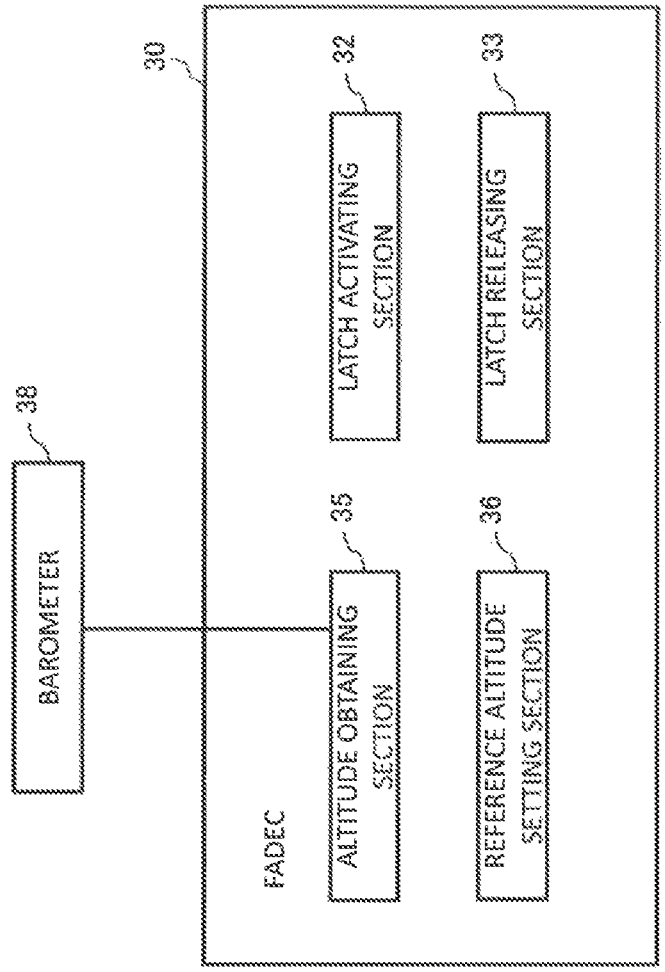
FIG. 5 is a block diagram showing the configuration of a FADEC according to a second embodiment.

A FADEC 30 of the second embodiment shown in FIG. 5 constitutes an engine control system 1 (FIG. 1) as with the FADEC 10 of the first embodiment, and is connected to an Avionics 2.

The description will be made below focusing on points different from those of the first embodiment. Configurations similar to those of the first embodiment will be denoted by the same reference numerals.

The FADEC 30 of the present embodiment includes an altitude obtaining section 35, a latch activating section 32, a latch releasing section 33, and a reference altitude setting section 36, as processing modules constituting a computer program.

The altitude obtaining section 35 converts a measured value (a difference ΔP from a surface pressure $P_0$) by a barometer 38 included in an engine 11 into an altitude, to obtain an altitude H of the aircraft with respect to a ground altitude $H_0$.

The latch activating section 32 activates the latch of the mode at a timing when a thrust lever 12 is set at the TOGA position.

The reference altitude setting section 36 sets a reference altitude at which the calculation of an altitude difference ΔH for latching is started, and holds the reference altitude in a memory.

A ground altitude $H_0$ at which the aircraft is on the ground is set as the initial value of the reference altitude.

After the aircraft takes off from the ground, if the restart of the engine 11 is performed in flight, the reference altitude is updated to an altitude lower than an altitude $H_S$ (restarting altitude) at which the restart is performed. In the present embodiment, the reference altitude is set at an altitude at which the aircraft shifts from a descent to an ascent by setting the thrust lever 12 at the TOGA position.

The latch releasing section 33 releases the latch when the altitude obtaining section 35 obtains the altitude difference ΔH, which is a difference from the above-described reference altitude.

The latch of the mode is performed within a range from the above-described reference altitude to the releasing altitude obtained by adding the altitude difference ΔH to the reference altitude.

The process in which the FADEC 30 latches the mode in taking off is similar to that of the first embodiment.

The process will be described with reference to FIG. 6.

As a process performed when the aircraft is parking on the ground (1), the following process is performed.

When the power of the engine control system 1 is turned on, the FADEC 30 is started.

When the engine 11 is started by an engine starting switch 14 and the thrust lever 12 is set at the TOGA position, the aircraft starts to take off.

In addition, when the thrust lever 12 is set at the TOGA position, the latch of the mode is activated by the latch activating section 32.

The latch of the mode continues after the thrust lever 12 is set at the TOGA position (1) until the altitude obtaining section 35 obtains the altitude difference ΔH (2) ((1) to (2)).

Then, when the altitude obtaining section 35 obtains the altitude difference ΔH (2), the latch releasing section 33 releases the latch. The mode can be thereby changed, and thus a mode change from the Take off mode to the CLB mode is typically performed (3).

There is a case where the engine 11 stops (4) and the engine 11 is restarted by the operation of the engine starting switch 14 (5), in flight in the air.

Figure 7:
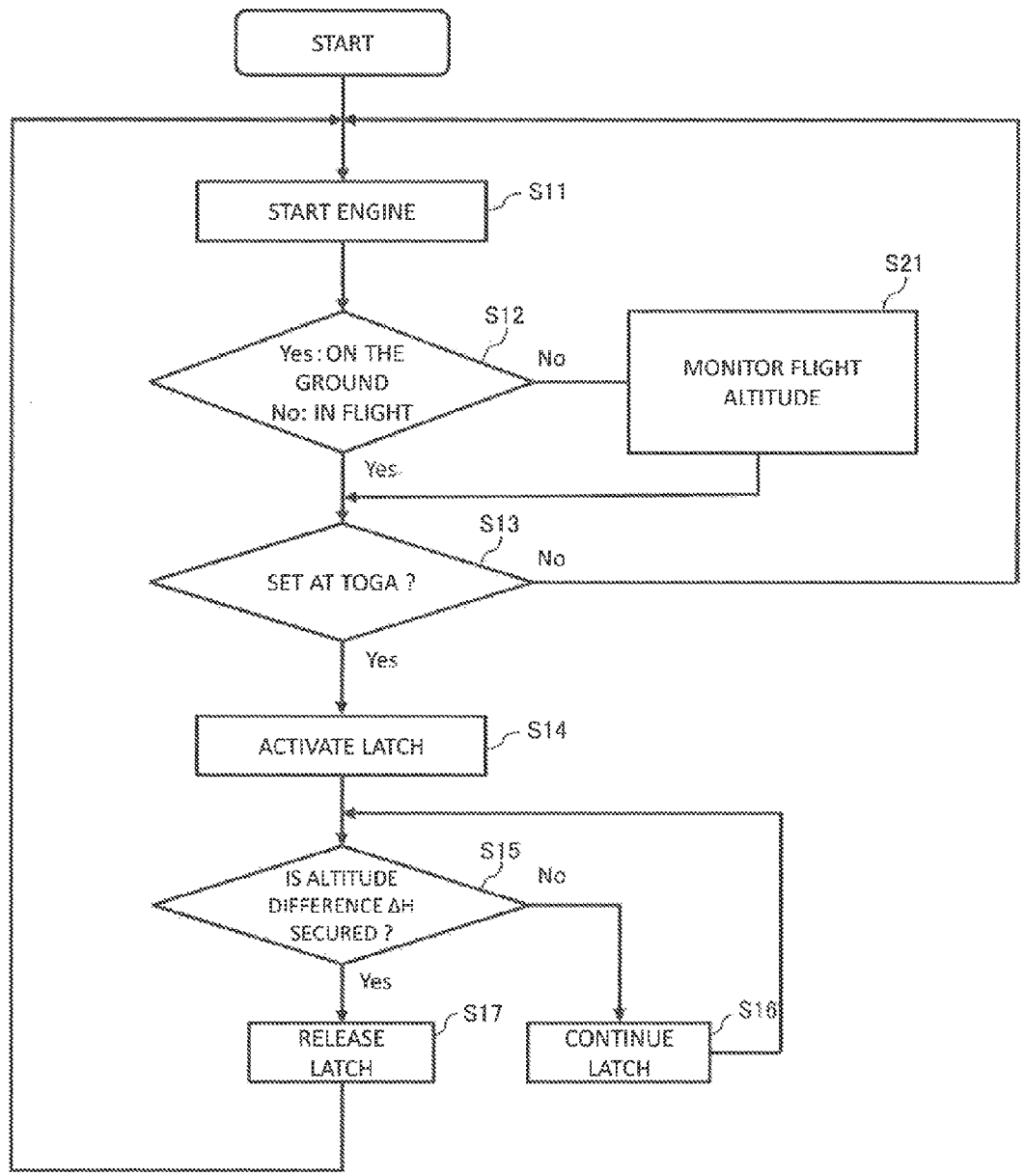
FIG. 7 is a flow chart showing the process in the FADEC according to the second embodiment.

FIG. 7 shows an example of a process subsequent to the start of the engine 11, which is performed during the flight after the power of the engine control system 1 is turned on (start) until turned off.

The description will be made below with reference to FIG. 7 and FIG. 6.

In the present embodiment, "a case where the engine is restarted in flight" is detected in engine starting step S11 and in-parking/in-flight determining step S12.

Figure 6:
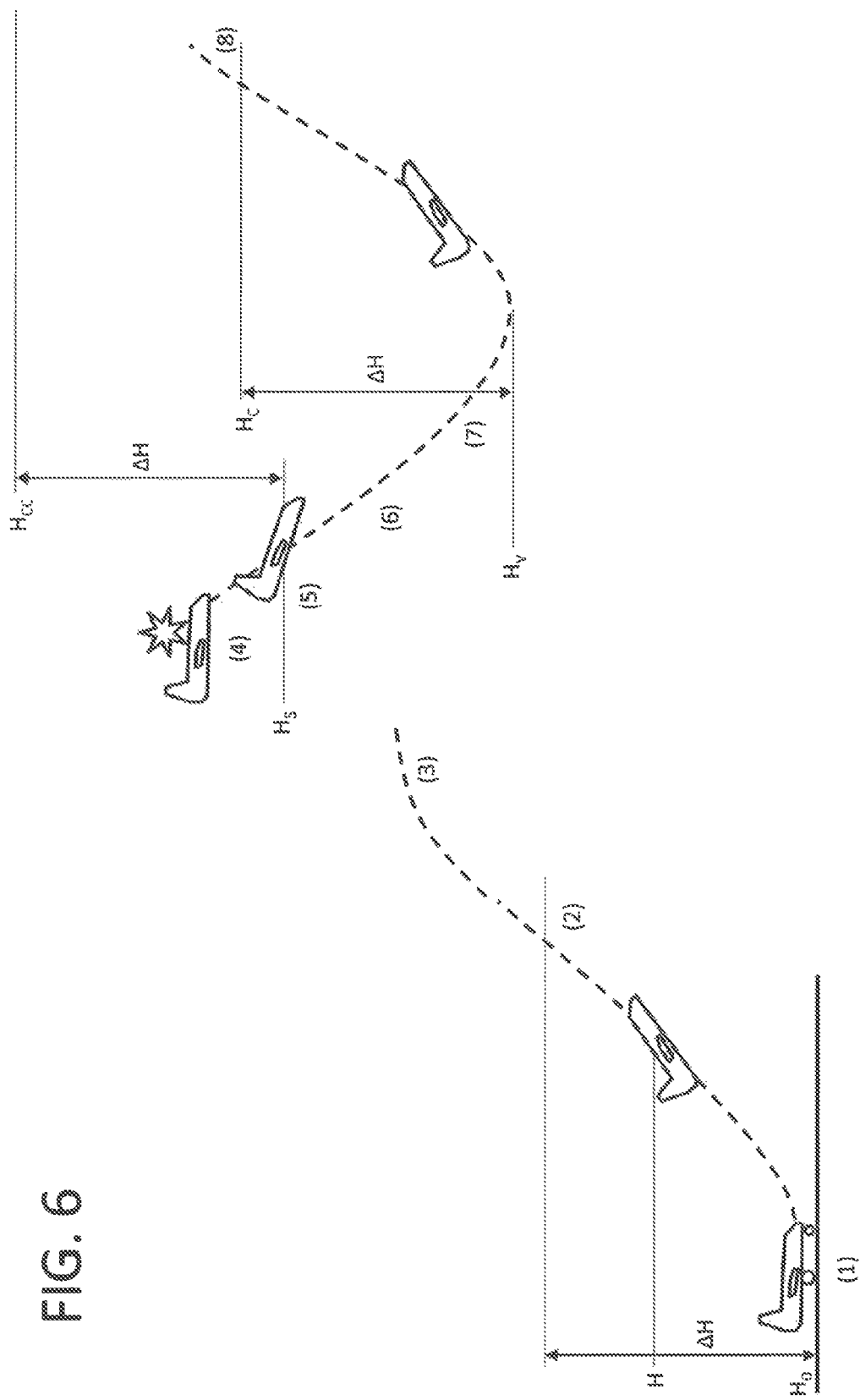
FIG. 6 is a schematic diagram showing the situations of taking off, engine stopping, and engine restarting, in the second embodiment.

In parking on the ground, the engine 11 is started by the operation of the engine starting switch 14 (engine starting step S11, (1) in FIG. 6). The Take off mode has been already selected as the mode of the engine 11 by the mode signal D2 from the Avionics 2.

The reference altitude setting section 36 sets a reference altitude at the ground altitude $H_0$, for example, at a timing when the engine 11 is started.

Next, it is determined whether the aircraft is on the ground or in flight (in-parking/in-flight determining step S12). This determination can be performed on the basis of, for example, main landing gear load data D3 by the above-described WOW sensors 23, the measurement value of an altitude by the radio altimeter 37, or a flag in a memory indicating the completion of the takeoff or a history of the latch operations.

Here, since the circumstance is that the engine 11 is started in parking on the ground, the answer to step S12 is Yes.

Thereafter, when the thrust lever 12 is set at the TOGA position at the time of taking off (Yes in step S13), the latch activating section 32 activates the latch of the mode (latch activating step S14).

When the latch is activated, it is determined whether or not the predetermined altitude difference ΔH is secured with respect to the reference altitude while the altitude obtaining section 35 obtains the altitude of the aircraft (altitude determining step S15). The reference altitude at this point is the ground altitude $H_0$.

If the determination in this step S15 is No, the latch of the mode continues (latch continuing step S16).

Until the altitude difference ΔH is secured with respect to the reference altitude ((2) in FIG. 6), the altitude determining step S15 and the latch continuing step S16 are repeated. The mode is thereby maintained at the Take off mode ((1) to (2) in FIG. 6).

When the altitude difference ΔH is secured with respect to the reference altitude (ground altitude $H_0$) (Yes in step S15), the latch releasing section 33 releases the latch of the mode (latch releasing step S17). The mode can be thereby changed, and for example, the mode is changed from the Take off mode to the CLB mode ((3) in FIG. 6).

Assume that the engine 11 thereafter stops in the air ((4) in FIG. 6) and the engine 11 is restarted ((5) in FIG. 6). Then, the flow returns to engine starting step S11 with respect to the engine 11 that stops and is restarted in flight out of the plurality of engines 11, and it is determined whether the aircraft is on the ground or in flight (step S12). Since the determination in this step S12 is No (in flight), the flow proceeds to step S21 of monitoring the flight altitude to set the reference altitude.

In step S21, the reference altitude setting section 36 starts monitoring the flight altitude with the altitude obtaining section 35 to stand ready for updating the reference altitude.

Even when the engine 11 is restarted, the altitude is lost while the engine 11 is starting. In addition, even when the start of the engine 11 is completed, the altitude is also lost when the aircraft descends to land at a nearby airport ((6) in FIG. 6).

In such a circumstance, the thrust lever 12 is set at the TOGA position to increase the thrust in such a case of intending to avoid an obstacle (Yes in step S13, (7) in FIG. 6).

At this point, the reference altitude setting section 36 updates the reference altitude to an altitude at which the TOGA position is set, continues monitoring the flight altitude, and sets the reference altitude at an altitude $H_V$ at which the aircraft is caused to shift from a descent to an ascent by setting the thrust lever 12 at the TOGA position. The altitude $H_V$ is the lowest altitude of a track curve that the aircraft passes after the restart of the engine.

Here, in a case of intending to turn in order to avoid an obstacle in the above-described circumstance, the thrust levers 12 of all the engines 11 are normally set at the TOGA positions, but with respect to the engine 11 that does not stop and is not restarted in flight, the flow does not proceed to engine starting step S11 again, and thus the reference altitude is not updated and remains at the ground altitude $H_0$.

With respect to the engine 11 that stops and is restarted in flight, the latch activating section 32 activates the latch of the mode (latch activating step S14) at a timing when the thrust lever 12 corresponding to the engine 11 is set at the TOGA position (Yes in step S15).

When the aircraft thereafter ascends from the altitude $H_V$ by the altitude difference ΔH ((8) in FIG. 6), the latch releasing section 33 releases the latch (step S16).

In the present embodiment, as described above, when the engine 11 is restarted in flight, the reference altitude is set at the altitude $H_V$ lower than the altitude of the restart.

If the calculation of the altitude difference ΔH is started with a starting altitude $H_S$ at which the engine 11 is restarted, the latch is not released at the time of restarting the engine in flight until the altitude once lost is recovered up to the starting altitude $H_S$ and is further gained up to an altitude $H_{CC}$ obtained by adding the altitude difference ΔH to the starting altitude $H_S$.

In contrast, in the present embodiment, the distance from the reference altitude to the starting altitude $H_S$ at the time of restarting the engine is also included in the calculation of the required altitude difference ΔH with respect to the reference altitude. The latch is thus released earlier at the altitude $H_C$ lower than the altitude $H_{CC}$, and the mode can be changed.

Therefore, it is possible to ease the restriction on the mode change in flight, thereby minimizing the influence on the thrust balance.

Modification of Second Embodiment

In the above second embodiment, both in taking off and in flight, the mode is latched until the aircraft ascends from the reference altitude by the same altitude difference ΔH. However, the altitude difference in taking off within which the latch is activated may differ from the altitude difference in flight within which the latch is activated.

In this case, the in-parking/in-flight determining section 34, which is described in the first embodiment (FIG. 2), may be provided in the FADEC 30, and the in-parking/in-flight determining section 34 may set a first altitude difference if the aircraft is determined to be on the ground, or may set a second altitude difference if the aircraft is determined to be in flight.

The first altitude difference can be set at, for example, 400 feet, as with the above-described altitude difference ΔH.

The second altitude difference may be greater or less than the first altitude difference.

Apart from the above, the configuration described in the above embodiments may be chosen or changed to other configurations as appropriate without departing from the gist of the present invention.

In the present invention, information used to determine whether the aircraft is on the ground or in flight is not limited to the load imposed on the main landing gears.

For example, a flag stored in a memory of the FADEC can be used. When the takeoff of the aircraft is completed, this flag is set to hold the completion of the takeoff. Then, every time the engine 11 is started, it can be determined whether the aircraft is on the ground or in flight on the basis of the flag.

Alternatively, it is possible to store a history of the operations of the latch in a memory and to determine whether the aircraft is on the ground or in flight when the engine 11 is started, on the basis of the history.

The memory used in the above may be volatile or non-volatile as long as a data content is not erased when the engine 11 stops.

Furthermore, it is possible to determine whether or not the aircraft is on the ground or in fight on the basis of an altitude measured by the radio altimeter 37 or an outside pressure measured by the barometer 38.

In addition, the operation flows showing the latching processes in the first embodiment and the second embodiment (FIG. 4 and FIG. 7) are merely examples, and various modifications are allowed.

In FIG. 4 and FIG. 7, the processes are started with the timing when the engine 11 is started (S11), but the timing is not limited thereto and the latching processes can be performed at any timing or by performing the determination of whether the aircraft is on the ground or in flight (S12) all the time.

What is claimed is:

1. An engine control computer of an aircraft that controls an engine of the aircraft in accordance with a mode of the engine, the computer comprising, as processing modules constituting a computer program:
   a latch operating section that latches the mode into a takeoff mode; and
   an in-parking/in-flight determining section that determines whether the aircraft is on the ground or flying off the ground, and
   the latch operating section operates when the in-parking/in-flight determining section determines that the aircraft is on the ground, and does not operate when the in-parking/in-flight determining section determines that the aircraft is in flight.

2. The engine control computer of the aircraft according to claim 1, wherein the in-parking/in-flight determining section determines that the aircraft is on the ground when a load is imposed on landing gears included in the aircraft, and determines that the aircraft is in flight when no load is imposed on the landing gears.

3. An aircraft comprising:

an engine that outputs a thrust; and the engine control computer according to claim 1 that controls the engine in accordance with the mode of the engine.

4. The engine control computer of the aircraft according to claim 1, wherein the in-parking/in-flight determining section determines that the aircraft is in flight when a flag stored in a memory of the engine control computer when the takeoff of the aircraft is complete is set, and determines that the aircraft is on the ground when the flag is not set.

5. The engine control computer of the aircraft according to claim 1, wherein the in-parking/in-flight determining section determines that the aircraft is in flight when there is a history of operations of the latch in a memory of the engine control computer, and determines that the aircraft is on the ground when there is not the history in the memory.

6. The engine control computer of the aircraft according to claim 1, wherein the in-parking/in-flight determining section determines whether or not the aircraft is on the ground or in flight on the basis of an altitude measured by a radio altimeter.

7. The engine control computer of the aircraft according to claim 1, wherein the in-parking/in-flight determining section determines whether or not the aircraft is on the ground or in flight on the basis of an outside pressure measured by a barometer.

\* \* \* \* \*

UNITED STATES PATENT AND TRADEMARK OFFICE
CERTIFICATE OF CORRECTION

PATENT NO. : 9,487,302 B2
APPLICATION NO. : 14/547384
DATED : November 8, 2016
INVENTOR(S) : Yoshihiro Nagashima Page 1 of 1

It is certified that error appears in the above-identified patent and that said Letters Patent is hereby corrected as shown below:

In the Specification

Column 8, Line 20, "AH" should read --$\Delta H$--.

Column 8, Line 41, "AH" should be --$\Delta H$--.

Signed and Sealed this
Twenty-eighth Day of February, 2017

Michelle K. Lee
*Director of the United States Patent and Trademark Office*